Oct. 27, 1931.  R. D. HORTON  1,828,804
MIRROR BRACKET
Filed Dec. 10, 1930
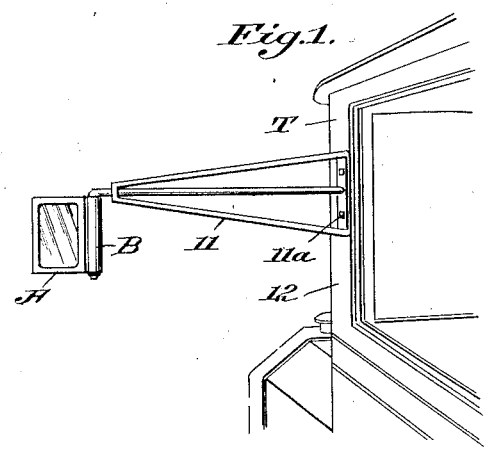
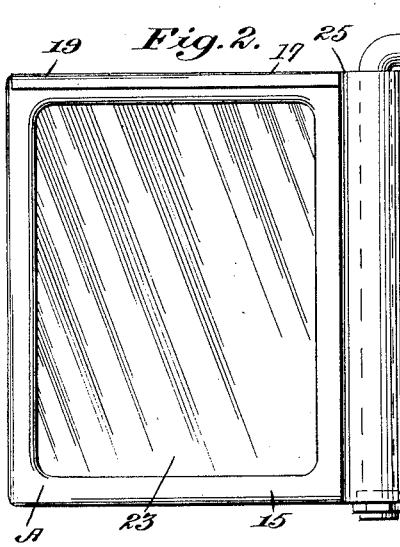
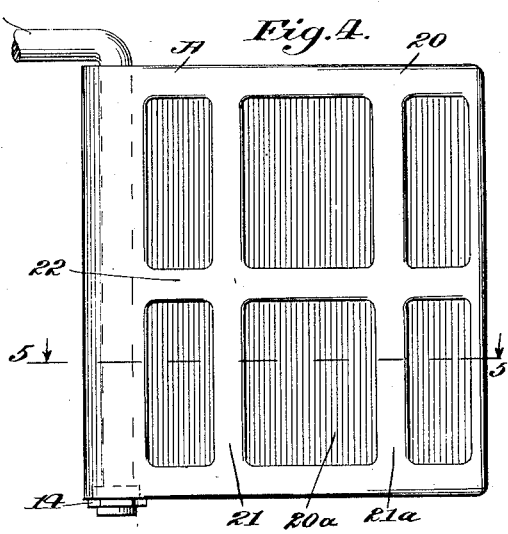
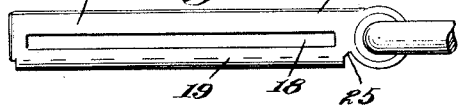
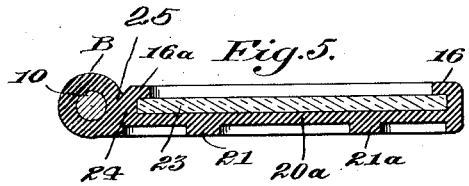
Inventor:
Ralph D. Horton,
Att'y.

Patented Oct. 27, 1931

1,828,804

UNITED STATES PATENT OFFICE

RALPH D. HORTON, OF GREGORY, SOUTH DAKOTA

MIRROR BRACKET

Application filed December 10, 1930. Serial No. 501,425.

The present invention relates to mirror supports and more particularly to a combined bracket and frame for the rear vision mirror of an automobile, truck, bus or other motor vehicle.

One of the objects of the present invention is to provide a bracket and frame for a rear vision mirror in which the frame will automatically return to its normal operative position, even though temporarily displaced therefrom.

A further purpose is to construct a device of the character indicated adapted to be mounted on a corner post or door frame of a truck, bus or similar vehicle, whereby the device will not be rendered permanently inoperative if it should come into contact with a rigid object.

A still further aim is to provide a combined mirror bracket and frame of material having a flexible or yieldable portion which will permit flexing of the frame relative to the bracket when brought into contact with a non-yieldable object.

Another purpose of the invention is to produce a combined bracket and frame of moulded rubber having an intermediate portion thereof of different flexibility and having means to permit the ready insertion and removal of a mirror.

These and other objects of the invention will be apparent from the following description and claims, taken in connection with the accompanying drawings, in which:

Fig. 1 is a perspective view showing the invention in operative position upon a vehicle;

Fig. 2 is an enlarged front elevational view showing the combined bracket and frame secured to the outer portion of the support;

Fig. 3 is a top plan view showing the slot for the insertion and removal of the mirror;

Fig. 4 is a rear elevational view of the combined bracket and frame of Fig. 2;

Fig. 5 is a sectional view taken on line 5—5 of Fig. 4.

In the use of rear vision mirrors it is very desirable to increase the field of vision to as great a degree as possible. On all vehicles where the view to the rear is obstructed so that a mirror within the interior thereof is ineffective, it has been customary to secure a support to the left corner post or door frame of the vehicle slightly forwardly of the driver and to attach the mirror thereto. Most of these structures have taken the form of metal arms which adjustably hold rigid mirror frames. In order to obtain proper results, it is ordinarily found necessary to retain the support interiorly of the side of the truck or bus body. When a mirror is located on the left corner post, the supporting bracket is frequently secured to the center of the back of the mirror frame, with the result that only one-half of the mirror surface is available for rear vision. Or if it is desired to have the entire mirror surface operative for rear vision, a part of the support will extend beyond the side of the vehicle. Further, as the mirror frame extends beyond the side of the vehicle, it is in position to be struck when the vehicle is moving in crowded traffic or through narrow passages, even though the spaces are wide enough to permit the body of the truck or bus to pass through. The result is broken mirror heads, bent supports, and frequently damage to the cab of the truck to which the support is attached.

To remedy the above defects, I have constructed my mirror frame A of rubber, having structurally integral therewith a tubular rubber bracket characterized by a sleeve portion B, for adjustably receiving the vertically disposed arm 10 of the metal support 11, which, is shown in Fig. 1, is secured by screws 11ª to the corner post 12 of the truck T. Mounted within the tubular bracket portion B is the depending arm 10, having a threaded lower portion. A nut 14 is adapted to work on this threaded portion so that upon the loosening thereof the frame A and its tubular bracket portion B may be adjusted relative to the support 11. Conversely, when the nut 14 is tightened the frame will remain normally fixed with respect to the vehicle.

The frame A is moulded of rubber, and, as shown, is of substantially rectangular contour, although not limited to this particular configuration, and has a bottom portion 15, two vertically disposed and parallel side channel sections 16, 16ª, a top section 17 with an opening 18, and an overhanging visor flange 19. The rear 20 of the mirror frame is characterized by a back 20ª having vertical reinforcing buffer ribs 21, 21ª intersected at right angles thereto by a single medial buffer rib 22 all of which, together with the channels and bottom portion, constitute a holder for the mirror 23. It will now be appreciated that the mirror may be mounted within the frame by sliding it through the opening 18 and that it will be retained in position by the bottom 15, channels 16, 16ª, back 20ª having ribs 21, 21ª and 22. In the event it becomes necessary to replace the mirror, it is a simple matter to slide it out of the frame.

The frame A and its tubular bracket portion B are moulded of rubber, and are connected by an increased flexible intermediate rubber section 24. To insure great flexibility this section is provided with a vertically extending V-shaped notch 25. Accordingly, it will be seen that the frame is thinner at this point to make it sufficiently yieldable so as to permit it to be pushed backwardly or forwardly, when struck, to a plane substantially that of the side of the truck or bus body. It will remain in this position until the pressure is removed and will then return to its normal condition. As this frame will extend only about five inches beyond the outer edge of the body of the truck, it is improbable that it will ever be struck close to its tubular bracket portion, as a driver would ordinarily not attempt to clear a space that narrow. But even if this does occur, thereby bending the frame at practically a right angle, it does not follow that it will be injured. Further, in the event the mirror and mirror frame are broken or damaged, cost of replacement will be very small when compared with the cost of replacing the ordinary mirror and frame, which, under like circumstances, are certain to be totally destroyed.

Attention is again directed to the fact that the entire frame A is extended beyond the truck body. With this arrangement, the field of vision is practically doubled as more fully indicated above. Accordingly, it will be appreciated that this is a very desirable result.

By providing the rubber buffers 21, 21ª and 22, the mirror is protected in the event the frame is forced against a rigid object, and the mirror is further protected by the provision of the rubber back 20ª.

In the manufacture of the device, consisting of the mirror frame and tubular bracket, it is preferably moulded as a unit and, if desired, by controlling the vulcanization, the bracket and mirror frame is made relatively hard while the intermediate connecting portion is left flexible and yieldable.

Further advantages than those already enumerated, such as low cost of manufacture, and simplicity of structure, will be readily apparent to those skilled in the art, and it will also be seen that various modifications may be made within the spirit of the invention, all of which are intended to be covered, if falling within the scope of the appended claims.

I claim:

1. A combined mirror bracket and frame having a flexible rubber portion connecting the same, and means on said bracket to receive a support.

2. A combined mirror bracket and frame each formed of rubber and having a portion connecting the same of relatively greater flexibility.

3. An integral mirror bracket and frame formed of rubber and having a portion intermediate the same of relatively greater flexibility, whereby the frame portion may be deflected relative to the bracket portion.

4. A device of the character described comprising a rubber frame having a pocket therein for removably receiving a mirror, a rubber bracket, and a connection intermediate the frame and bracket of relatively greater flexibility, said frame, bracket and connection being structurally integral.

5. A device of the character described comprising, a rubber frame having a pocke , said pocket characterized by a back having reinforcing rubber buffer ribs, a rubber bracket formed structurally integral with one side of said frame, and a portion connecting said bracket and frame of relatively greater flexibility.

6. A device of the character described comprising, a rubber mirror-receiving frame, a tubular rubber bracket, a support adapted to be attached to a vehicle adjustably received within said bracket, means for securing the bracket to the support, and a portion connecting the bracket and frame of relatively greater flexibility.

7. A device of the character described comprising a rubber mirror-receiving frame, said frame having a rubber bracket structurally integral with one side thereof, and a support adapted to be attached to a vehicle having means to engage said bracket, whereby to support the mirror frame for movement relative to the support.

8. In a device of the character described, a rubber mirror frame having a tubular rubber bracket structurally integral with one side of said frame.

In testimony whereof I affix my signature.

RALPH D. HORTON.